United States Patent
Griffin et al.

(10) Patent No.: US 12,335,383 B2
(45) Date of Patent: Jun. 17, 2025

(54) FOR CRYPTOGRAPHIC SYNCHRONIZATION WITHIN FEDERATED QUANTUM COMPUTING ENVIRONMENTS

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 304 days.

(21) Appl. No.: 18/173,519

(22) Filed: Feb. 23, 2023

(65) Prior Publication Data

US 2024/0291644 A1  Aug. 29, 2024

(51) Int. Cl.
H04L 9/08 (2006.01)

(52) U.S. Cl.
CPC .......... *H04L 9/0869* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 9,509,506 B2 | 11/2016 | Hughes et al. | |
| 11,245,519 B1 * | 2/2022 | Stapleton, Jr. | H04L 9/0855 |
| 11,895,232 B1 * | 2/2024 | Stapleton | G06N 10/00 |
| 12,081,216 B1 * | 9/2024 | Kandele | H03K 19/17768 |
| 2017/0039505 A1 * | 2/2017 | Prabhakara | G06Q 10/063118 |
| 2019/0243611 A1 | 8/2019 | Martin et al. | |

FOREIGN PATENT DOCUMENTS

| | | |
|---|---|---|
| EP | 3732562 A1 | 11/2020 |
| GB | 2594929 A | 11/2021 |
| KR | 20210045285 A | 4/2021 |

OTHER PUBLICATIONS

Ahmad, S.F., et al., "Enhancing Security in the Industrial IoT Sector using Quantum Computing," 2021 28th IEEE International Conference on Electronics, Circuits, and Systems (ICECS), Dubai, United Arab Emirates, doi: 10.1109/ICECS53924.2021.9665527, 2021, 5 pages.

Park, Jungmin, et al., "SCR-QRNG: Side-Channel Resistant Design using Quantum Random Number Generator," 10.1109/ICCAD45719.2019.8942152, 2019, 8 pages.

* cited by examiner

*Primary Examiner* — Trang T Doan
(74) *Attorney, Agent, or Firm* — Dority & Manning, P.A.

(57) ABSTRACT

Instructions to generate a seed via quantum random number generation for cryptographic synchronization within a federated quantum computing environment comprising a quantum computing system and one or more second quantum computing systems are received by the quantum computing system. Information descriptive of one or more characteristics of (a) the quantum computing system, or (b) some other computing entity of the federated quantum computing environment is obtained. A seed chunk size is determined based at least in part on the one or more characteristics. The seed is generated for cryptographic synchronization, wherein a size of the seed is equivalent to the seed chunk size. The seed is provided to the one or more second quantum computing systems.

20 Claims, 5 Drawing Sheets

FOR CRYPTOGRAPHIC SYNCHRONIZATION WITHIN FEDERATED QUANTUM COMPUTING ENVIRONMENTS

BACKGROUND

Quantum computing is an emerging technology that exploits quantum mechanical phenomena. Quantum computing techniques organize information in qubits, which are analogous to the bits used in classical computing. Qubits can be implemented using a variety of different quantum computing devices (e.g., superconducting qubits, photonic qubits, etc.). One benefit to quantum computing devices is that they act as a source of true randomness. More specifically, measurements of quantum processes (e.g., implemented via the quantum computing devices) that are naturally non-deterministic can serve as truly random numbers for the provision of cryptographic services.

SUMMARY

Quantum random number generation is provided as a service that dynamically determines a seed chunk size. By dynamically determining the seed chunk size, seeds can be iteratively provided to computing entities within a federated quantum computing environment to facilitate cryptographic synchronization.

In one implementation, a computer-implemented method is provided. The computer-implemented method includes receiving, by a quantum computing system that implements a Quantum Seed Chunk Size (QSCS) service, instructions to generate a seed via quantum random number generation for cryptographic synchronization within a federated quantum computing environment comprising the quantum computing system and one or more second quantum computing systems. The computer-implemented method includes obtaining information descriptive of one or more characteristics of (a) the quantum computing system, or (b) some other computing entity of the federated quantum computing environment. The computer-implemented method includes determining a seed chunk size based at least in part on the one or more characteristics. The computer-implemented method includes generating the seed for cryptographic synchronization, wherein a size of the seed is equivalent to the seed chunk size. The computer-implemented method includes providing the seed to the one or more second quantum computing systems.

In another implementation a quantum computing system that implements a QSCS service is provided. The quantum computing system includes one or more computing devices to receive instructions to generate a seed via quantum random number generation for cryptographic synchronization within a federated quantum computing environment comprising the quantum computing system and one or more second quantum computing systems. The one or more computing devices are further to obtain information descriptive of one or more characteristics of (a) the quantum computing system, or (b) some other computing entity of the federated quantum computing environment. The one or more computing devices are further to determine a seed chunk size based at least in part on the one or more characteristics. The one or more computing devices are further to generate the seed for cryptographic synchronization, wherein a size of the seed is equivalent to the seed chunk size. The one or more computing devices are further to provide the seed to the one or more second quantum computing systems.

In another implementation, a non-transitory computer-readable storage medium is provided. The non-transitory computer-readable storage medium includes executable instructions to cause a processor device of a quantum computing system that implements a QSCS service to receive instructions to generate a seed via quantum random number generation for cryptographic synchronization within a federated quantum computing environment comprising the quantum computing system and one or more second quantum computing systems. The executable instructions are further to cause the processor to obtain information descriptive of one or more characteristics of (a) the quantum computing system, or (b) some other computing entity of the federated quantum computing environment. The executable instructions are further to cause the processor to determine a seed chunk size based at least in part on the one or more characteristics. The executable instructions are further to cause the processor to generate the seed for cryptographic synchronization, wherein a size of the seed is equivalent to the seed chunk size. The executable instructions are further to cause the processor to provide the seed to the one or more second quantum computing systems.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
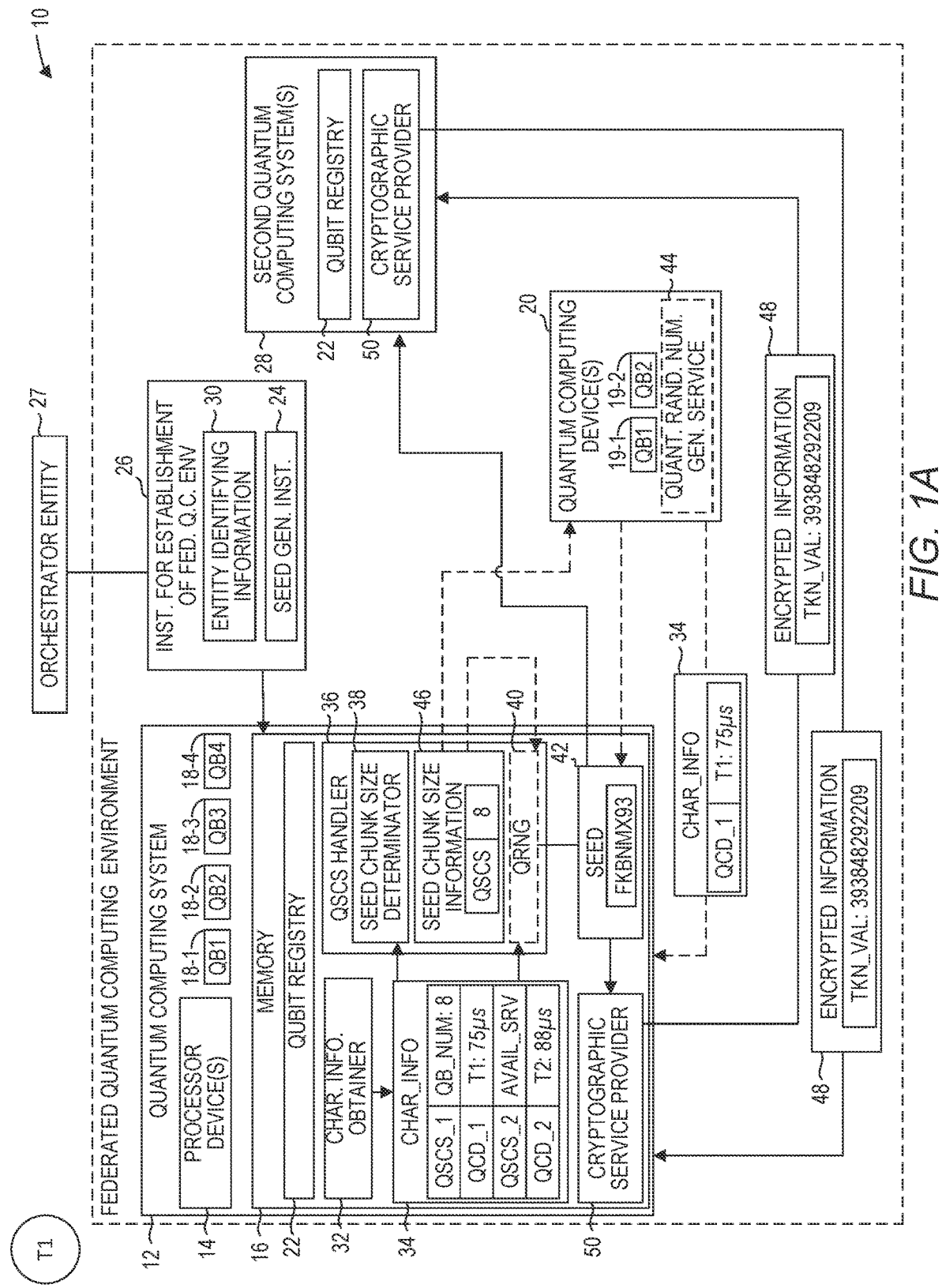
FIG. 1A is a block diagram of a federated quantum computing environment in which truly random numbers can be generated and provided for cryptographic synchronization at a first time T1 according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Random numbers are essential in a wide variety of cryptographic use cases (e.g., message encryption, resource access control, etc.). In many cases, a random number generator will first be used to generate a random data stream (i.e., a stream of random values) that acts as a seed. The seed can be distributed to multiple computing devices (e.g., computing devices organized as a computing cluster, etc.) so that the devices can securely exchange messages. For example, if one device encrypts a message using the seed, another device that has the seed will be able to decrypt the message, allowing for secure cryptographic communication.

One use for random number seeds is to control access to resources and/or services within a federated quantum computing environment (e.g., a cluster of quantum computing devices or systems). For example, a quantum computing system within the federated quantum computing environment that provides access to quantum computing resources can require an access token generated using a particular seed. However, managing the provision of random number seeds to other computing devices within the federated quantum computing environment can be prohibitively difficult. For example, when input changes occur within the environment (the allocation or deallocation of qubits from the environment, the addition or removal of new devices to the environment, etc.) it is sometimes necessary to generate and provide a new random number seed to each computing device within the federated quantum computing environment.

Accordingly, implementations of the present disclosure propose seed generation for cryptographic services within federated quantum computing environments. More specifically, a Quantum Seed Chunk Size (QSCS) computing system can receive information indicating the instantiation of a federated quantum computing environment. The QSCS computing system can obtain information descriptive of characteristic(s) of the QSCS computing system (e.g., T1 times and/or T2 times for qubit(s) associated with the QSCS computing system, a number of qubits currently active, etc.) and, based on the information, determine a seed chunk size for a random number seed (i.e., a number of values to include in the seed). The QSCS computing system can provide the seed chunk size to a quantum random number generator, which can return a seed that includes a number of truly random values equivalent to the number of values indicated by the seed chunk size. The QSCS computing system can then provide the seed to the other computing systems included in the federated quantum computing environment. In such fashion, the QSCS computing system can ensure synchronicity within the federated quantum computing environment by ensuring that each system within the environment utilizes the same seed to provide cryptographic services.

FIG. 1A is a block diagram of a federated quantum computing environment in which truly random numbers can be generated and provided for cryptographic synchronization at a first time T1 according to some implementations of the present disclosure. The federated quantum computing environment 10 includes a quantum computing system 12 that operates in a quantum environment but can operate using classical computing principles or quantum computing principles. More specifically, the quantum computing system 12 can operate in a quantum environment to provide a Quantum Seed Chunk Size (QSCS) service. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements four qubits 18-1-18-4 (generally, qubits 18). It should be noted that, in some implementations, one or more of the qubits 18 may be located on a quantum computing device or system located remotely from the quantum computing system 12. For example, qubits 18-1-18-2 may be located at or within the quantum computing system 12. Qubits 18-3-18-4 may be located at quantum computing device(s) 20. For example, the quantum computing device(s) 20 can include remote qubits 19-1-19-2 (generally, remote qubits 19). The quantum computing device(s) 20 may allocate remote qubits 19-1-19-2 to serve as qubits 18-3-18-4. The qubits 18-3-18-4 (i.e., remote qubits 19-1-19-2) may process information remotely at the quantum computing device(s) 20, which may in turn communicate processed information to the quantum computing system 12 (e.g., via one or more networks, etc.). In such fashion, the quantum computing system 12 may increase a quantum processing capacity by leveraging remotely located qubits.

The federated quantum computing environment 10 is a logical grouping, or clustering, of computing systems, devices, and/or resources. More specifically, the federated quantum computing environment 10 is an environment in which a number of separate devices and/or systems share resources (e.g., hardware resources, compute cycles, services, etc.) via a central management framework that enforces consistent configuration and policies. It should be noted that the federated quantum computing environment 10 can include any type or manner of computing device or system. For example, in some implementations, the federated quantum computing environment 10 can include a number of quantum computing systems and classical computing systems. Additionally, in some implementations, the federated quantum computing environment 10 can include quantum computing devices, such as quantum computing device(s) 20, that can implement and measure quantum processes. For example, the quantum computing device(s)

20 can include hardware and/or software resources that implement quantum processes by maintaining photon(s) in superposition.

The memory 16 of the quantum computing system 12 includes a qubit registry 22 that maintains information about the qubits 18-1-18-4, including, by way of non-limiting example, a total qubits counter that identifies the total number of qubits 18 implemented by the quantum computing system 12, a total available qubits counter that maintains count of the total number of qubits 18 that are currently available for allocation, etc.

The quantum computing system 12 can obtain seed generation instructions 24 that instruct the quantum computing system 12 to generate a seed via quantum random number generation for cryptographic synchronization. The utilization of seeds for cryptographic synchronization will be discussed in greater detail below. In some implementations, the quantum computing system 12 can receive the seed generation instructions 24 within establishment instructions 26 that instruct the quantum computing system 12 to establish the federated quantum computing environment 10.

For example, an orchestrator entity 27 (e.g., a computing system that supervises, facilitates, or otherwise manages the federated quantum computing environment 10) can provide the establishment instructions 26 to the quantum computing system 12. The establishment instructions 26 can indicate a number of computing entities (e.g., quantum computing system(s)/device(s), classical computing system(s)/device(s), etc.) to be included within the federated quantum computing environment 10. Additionally, in some implementations, the establishment instructions 26 can include entity identifying information 30 that indicates an identity (e.g., a MAC address, an IP address, an identifier, etc.) of each of the computing entities. For example, assume that second quantum computing system(s) 28 include six quantum computing systems that are to be included in the federated quantum computing environment 10. The establishment instructions 26 can indicate the number of computing entities to be included (e.g., 6 computing entities), the type of computing entities to be included (e.g., quantum computing systems), and can include computing entity identifying information 30 that includes an identifier for each of the computing entities.

Upon receipt of the seed generation instructions 24, the quantum computing system 12 can utilize characteristic information obtainer 32 to obtain characteristic information 34 descriptive of characteristic(s) of the quantum computing system 12, the second quantum computing system(s) 28, the federated quantum computing environment 10, and/or the quantum computing device(s) 20. It should be noted that the characteristic(s) described by the characteristic information 34 can be any type or manner of parameter, value, state, etc. associated with computing entities included in the federated quantum computing environment 10. For example, the characteristic information 34 can include a number of computing entities currently included in the federated quantum computing environment 10. For another example, the characteristic information 34 can include a number of qubits currently accessible or allocated to the quantum computing system 12. For another example, the characteristic information 34 can include state parameter values for qubits included in the federated quantum computing environment 10 (e.g., T1 times, T2 times, spin, etc.).

In some implementations, the characteristic information obtainer 32 can generate at least some of the characteristic information 34. For example, to generate the characteristic information 34, the characteristic information obtainer 32 can measure and store current state values associated with qubits implemented by the quantum computing system 12. Additionally, or alternatively, in some implementations, the characteristic information obtainer 32 can obtain the characteristic information 34 from other computing entities included in the federated quantum computing environment 10. For example, the characteristic information obtainer can obtain characteristic information 34 from the quantum computing device(s) 20 that includes current state values of the remote qubits 19.

As described previously, the quantum computing system 12 can implement a QSCS service that can facilitate provision of seeds generated using quantum random number generation. By doing so, the quantum computing system 12 can ensure that cryptographic operations performed by computing entities within the federated quantum computing environment are synchronous. The quantum computing system 12 can implement the QSCS service using QSCS handler 36. It should be understood that performing the QSCS service can include some, or any, of the operations described with regards to FIGS. 1A and/or 1B.

More specifically, the QSCS handler 36 can include a seed chunk size determinator 38. The seed chunk size determinator 38 can process the characteristic information 34 to determine a size for the seed to be generated using quantum random number generation. For example, as described previously, the quantum computing system 12 can obtain the characteristic information 34 using the characteristic information obtainer 32. Based on the characteristic information 34, the quantum computing system 12 can determine a seed chunk size for a seed 42.

In some implementations, the QSCS handler 36 can include a quantum random number generator 40. The quantum random number generator 40 can measure a quantum state of a quantum computing device (e.g., qubits 18) of the quantum computing system 12 to generate truly random numbers. For example, qubit 18-1 can be a photonic qubit that maintains a photon in a state of superposition. The seed chunk size determinator 38 can determine a seed chunk size of 8 values. The quantum computing system 12 can obtain measurements of the state of the photon. Based on the measurements, the quantum random number generator 40 can generate a stream of 8 truly random values. The quantum computing system 12 can utilize the 8 random values as a seed 42 (e.g., FKBNMX93, as depicted).

In some implementations, the quantum random number generator 40 can process the characteristic information 34 to generate the random values of the seed 42. For example, characteristic information 34 can include current state measurements for each qubit included in the federated quantum computing environment 10 (e.g., qubits 18, remote qubits 19, etc.). The quantum random number generator 40 can process the characteristic information 34 to generate the seed 42.

Alternatively, in some implementations, the QSCS handler 36 can provide a request for quantum random number generation to a quantum random number generation service 44 that is implemented by other quantum computing device(s) 20 or second quantum computing system(s) 28 within the federated quantum computing environment. For example, the QSCS handler 36 can generate seed chunk size information 46. The seed chunk size information 46 can indicate the seed chunk size (i.e., the number of values to be included in the seed 42). The QSCS handler 36 can provide the seed chunk size information 46 to the quantum random number generation service 44, and the quantum random number generation service 44 can return a data stream of random values (e.g., alphanumeric characters, etc.) of a length indicated by the seed chunk size information 46. In some implementations, the quantum computing system 12 can also provide the characteristic information 34 to the quantum random number generation service 44 alongside the seed chunk size information 46.

The quantum computing system 12 can distribute the seed 42 to other computing entities within the federated quantum computing environment 10. For example, the quantum computing system 12 can receive the values for the seed 42 in a data stream from the quantum computing device(s) 20. The quantum computing system 12 can then provide the seed 42 to the second quantum computing system(s) 28. As the quantum computing system 12 and the second quantum computing system(s) 28 both possess the same seed 42, the systems can securely exchange cryptographic information 48-1 and 48-2 (generally, cryptographic information 48). In such fashion, the quantum computing system 12 can procure and distribute seeds with truly random numbers to other computing systems within the federated quantum computing environment 10 to ensure synchronicity between computing entities within the environment.

As a more specific example, the quantum computing system 12 can include a cryptographic service provider 50 that can provide various cryptographic services (e.g., encryption, decryption, hashing, establishment of secure channels, etc.). Each of the second quantum computing system(s) 28 can also include a cryptographic service provider 50. The quantum computing system can generate cryptographic information 48-1 using the seed 42 and can send the cryptographic information 48-1 to the second quantum computing system(s) 28. The second quantum computing system(s) 28 can use the cryptographic service provider 50 to decrypt the cryptographic information 48-1 in conjunction with the seed 42 received from the quantum computing system 12.

In some implementations, the quantum computing system 12 can receive information indicative of successful establishment of the federated quantum computing environment 10. For example, assume that successful establishment of the federated quantum computing environment 10 requires distribution of the seed 42 to each computing entity within the federated quantum computing environment 10. The quantum computing system 12 can distribute the seed 42 to each of the one or more second quantum computing systems 28, and can provide information indicating successful provision of the seed 42 to the orchestrating entity 27. In response, the orchestrating entity 27 can provide information indicating successful establishment of the federated quantum computing environment 10.

Figure 1B:
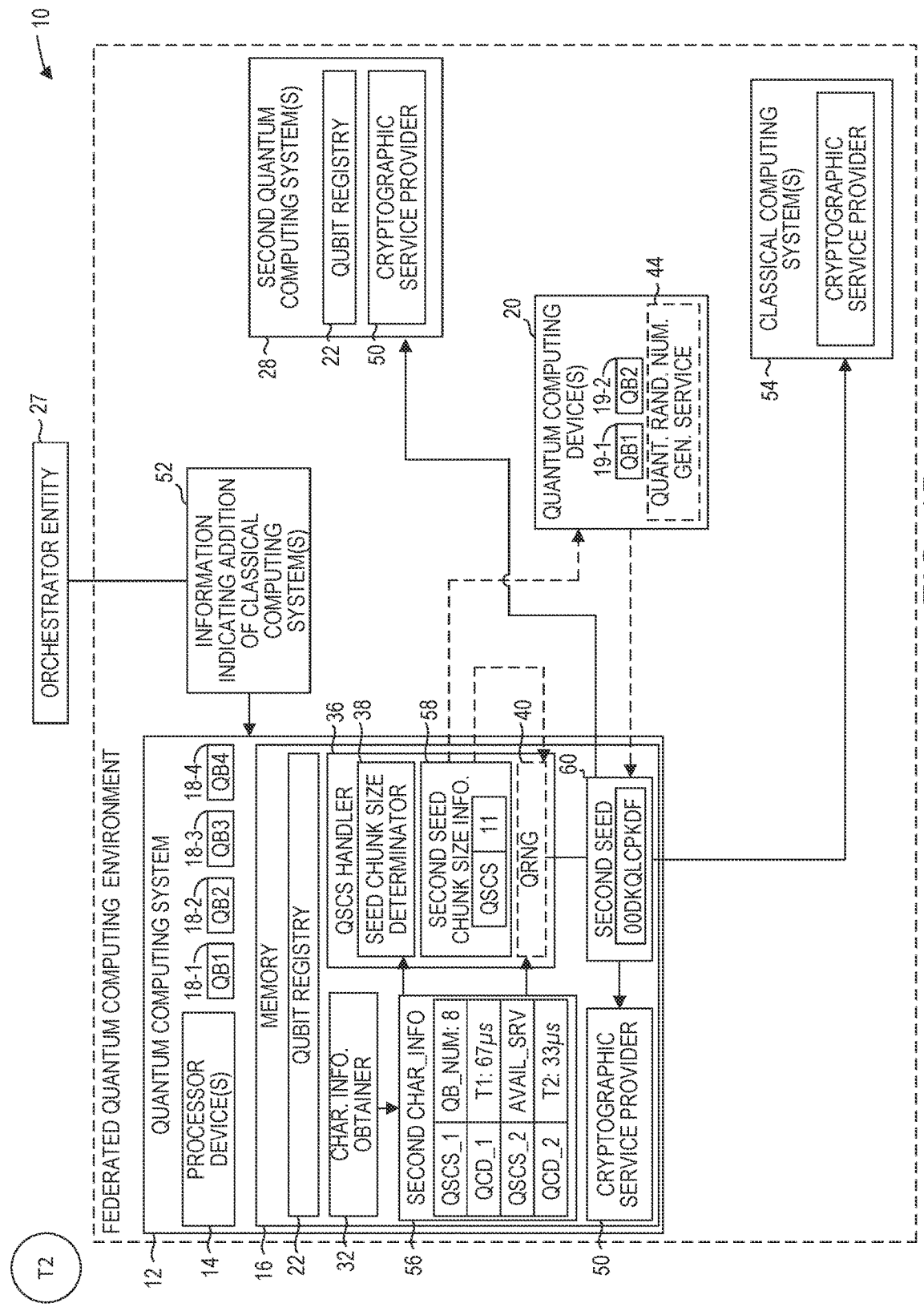
FIG. 1B is a block diagram of the federated quantum computing environment at a second time T2 subsequent to time T1 according to some implementations of the present disclosure.

FIG. 1B is a block diagram of the federated quantum computing environment at a second time T2 subsequent to time T1 according to some implementations of the present disclosure. Specifically, at a time T2 that is subsequent to time T1, the quantum computing system 12 can receive member addition information 52 from the orchestrator entity 27. The member addition information 52 can indicate to the quantum computing system 12 that more computing entities have been added to the federated quantum computing environment 10 (e.g., by the orchestrator entity 27, etc.). Specifically, the member addition information 52 can indicate that classical computing system(s) 54 have been added to the federated quantum computing system 12.

In some implementations, the member addition information 52 can further indicate a type of computing entity, number of computing entities, identifier of computing entities, etc. For example, if the classical computing system(s) 54 include two systems, the member addition information 52 can indicate that two separate classical computing systems are being added to the federated quantum computing environment 10 alongside identifiers for both systems.

In response to the member addition information 52, the quantum computing system 12 can utilize the QSCS handler to determine whether to update any seeds that have been provided to other computing entities within the federated quantum computing environment 10. Based on certain criteria (e.g., a length of time since seeds were last distributed, security capabilities of the recently added computing entities, etc.) the quantum computing system 12 can determine to generate a second seed for distribution to other computing entities within the federated quantum computing environment 10. For example, while performing the QSCS service, the quantum computing system 12 can detect a change in a quantity of computing entities included in the federated quantum computing environment 10.

To do so, the quantum computing system 12 can generate second characteristic information 56. The second characteristic information 56 can be, or otherwise include, updated values for the characteristics of the characteristic information 34 of FIG. 1A. In other words, the second characteristic information 56 can include, describe, or otherwise indicate any changes to the characteristic(s) described by the characteristic information 34 of FIG. 1A. For example, the second characteristic information 56 can include updated values for the number of qubits available to the quantum computing system at time T2.

The quantum computing system 12 can process the second characteristic information 56 with the seed chunk size determinator 38 to generate second seed chunk size information 58. As the second characteristic information 56 includes values different than that of the characteristic information 34, the second seed chunk size information 58 can indicate a seed size different than that of the seed chunk size information 46 (e.g., a seed size of 11 rather than 8).

The quantum computing system 12 can either generate a second seed 60 or receive a second seed 60 (e.g., from the quantum random number generator service 44) as described with regards to FIG. 1A. The quantum computing system 12 can then provide the second seed 60 to the second quantum computing system(s) 28 and the classical computing system(s) 54. The computing entities of the federated quantum computing environment 10 can utilize the second seed 60 to perform synchronous provision of cryptographic services. In such fashion, implementations of the present disclosure can dynamically offer a QSCS service to update seeds for computing entities within a federated quantum computing environment.

Figure 2:
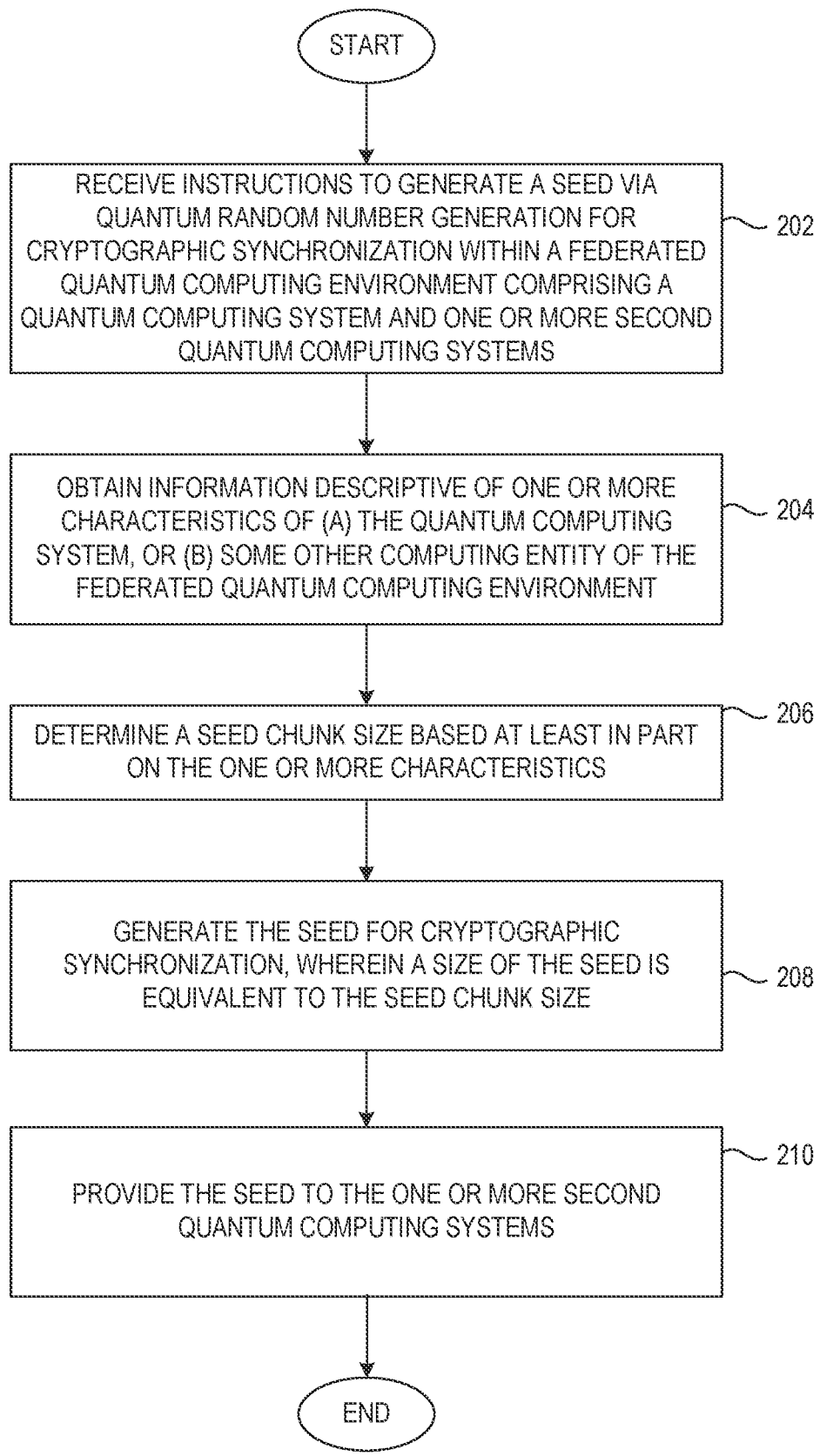
FIG. 2 is a flowchart of a method for generation and distribution of truly random seeds for cryptographic synchronization within a federated quantum computing environment according to some implementations of the present disclosure.

FIG. 2 is a flowchart of a method 200 for generation and distribution of truly random seeds for cryptographic synchronization within a federated quantum computing environment according to some implementations of the present disclosure. FIG. 2 will be discussed in conjunction with FIGS. 1A-1B. The quantum computing system 12, which implements a QSCS service, receives seed generation instructions 24 to generate a seed 42 via quantum random number generation for cryptographic synchronization within a federated quantum computing environment 10 that includes the quantum computing system 12 and one or more second quantum computing system(s) 28 (FIG. 2, Block 202). The quantum computing system 12 obtains characteristic information 34 that is descriptive of one or more characteristics of (a) the quantum computing system 12, or (b) some other computing entity of the federated quantum computing environment 10 (FIG. 2, Block 204). The quantum computing system 12 determines a seed chunk size (e.g., seed chunk size information 46) based at least in part on the one or more characteristics (e.g., characteristic information 34) (FIG. 2, Block 206). The quantum computing system 12 generates the seed 42 for cryptographic synchronization (FIG. 2, Block 208). The size of the seed 42 is equivalent to the seed chunk size (e.g., as described by the characteristic information 34). The quantum computing system 12 provides the seed 42 to the one or more second quantum computing system(s) 28 (FIG. 2, Block 210).

Figure 3:
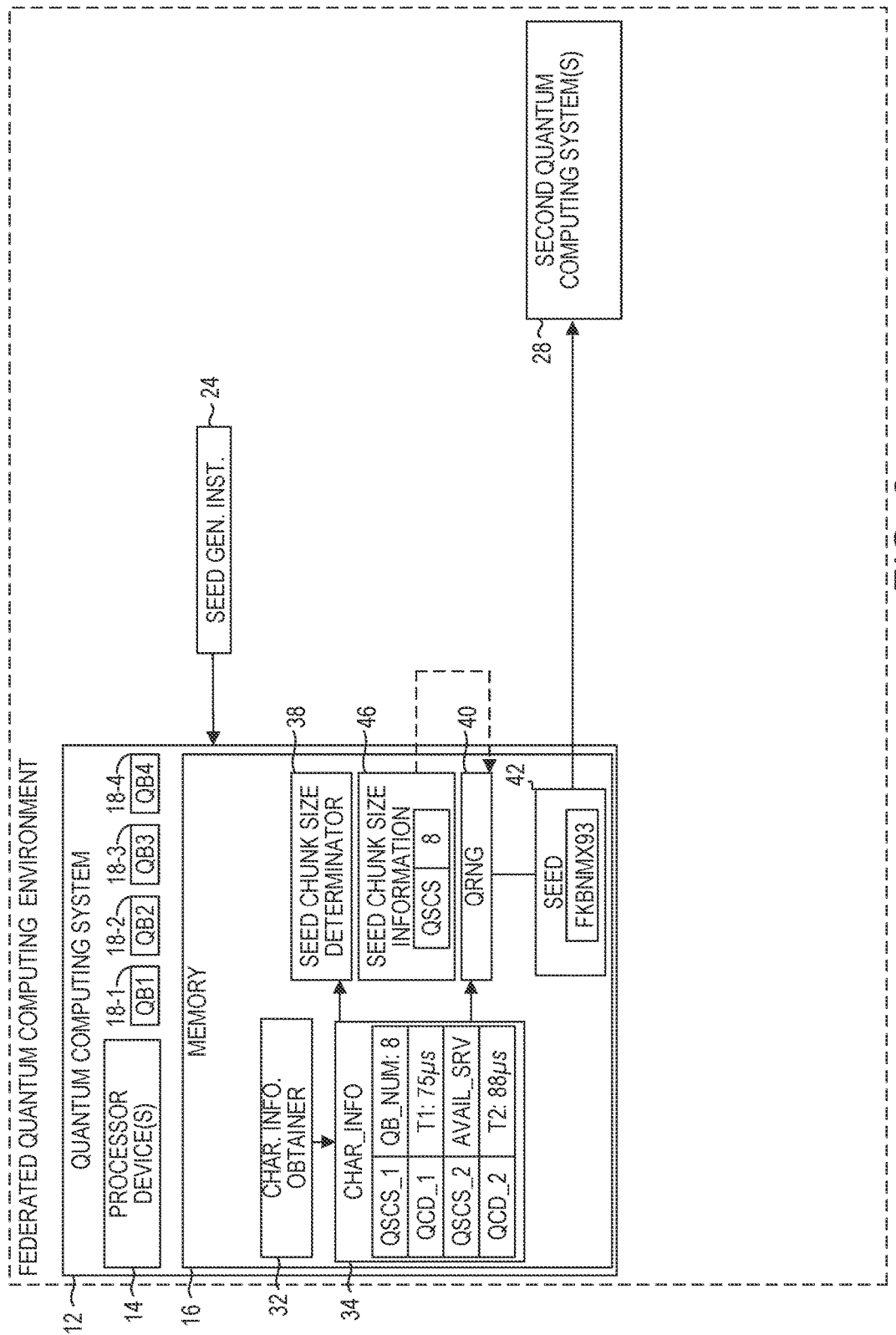
FIG. 3 is a simplified block diagram of the federated quantum computing environment illustrated in FIG. 1A according to some implementations of the present disclosure.

FIG. 3 is a simplified block diagram of the federated quantum computing environment illustrated in FIG. 1A according to some implementations of the present disclosure. The federated quantum computing environment 10 includes the quantum computing system 12 that includes the processor device(s) 14, the memory 16, and the qubits 18. The processor device(s) 14 are to receive seed generation instructions 24 to generate a seed 42 via quantum random number generation 40 for cryptographic synchronization within the federated quantum computing environment 10 that includes the quantum computing system 12 and the one or more second quantum computing system(s) 28. The processor device(s) 14 are to obtain characteristic information 34 descriptive of one or more characteristics of (a) the quantum computing system 12 or (b) some other computing entity of the federated quantum computing environment 10. The processor device(s) 14 are to determine a seed chunk size 46 based at least in part on the one or more characteristics. The processor device(s) 14 are to generate the seed 42 for cryptographic synchronization, wherein a size of the seed 42 is equivalent to the seed chunk size 46. The processor device(s) 14 are to provide the seed 42 to the one or more second quantum computing system(s) 28.

Figure 4:
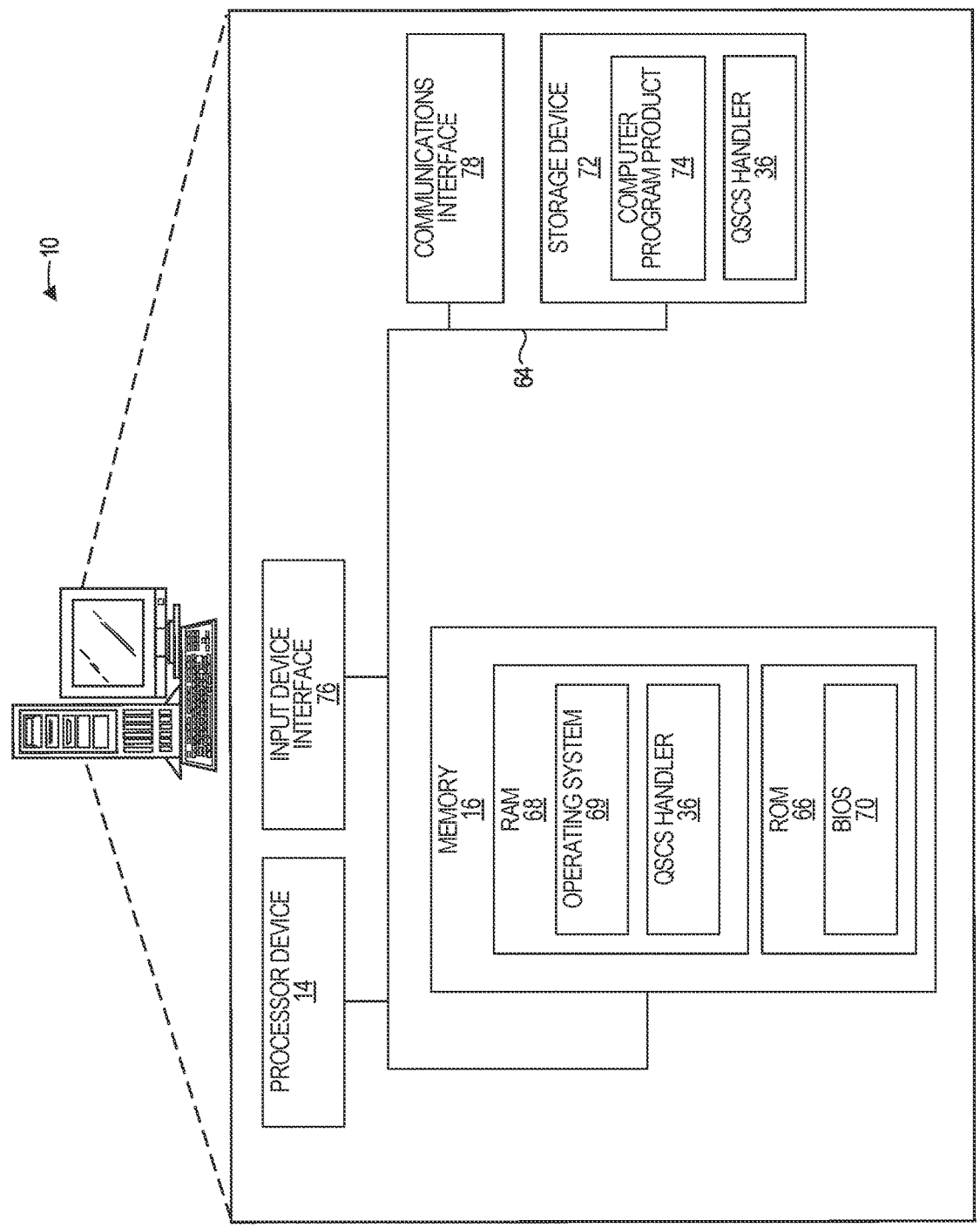
FIG. 4 is a block diagram of the quantum computing system suitable for implementing examples according to one implementation of the present disclosure.

FIG. 4 is a block diagram of the quantum computing system 12 suitable for implementing examples according to one implementation of the present disclosure. The quantum computing system 12 may comprise any computing or electronic device capable of including firmware, hardware, and/or executing software instructions to implement the functionality described herein, such as a computer server, a desktop computing device, a laptop computing device, a smartphone, a computing tablet, a quantum computing device, qubit(s), or the like. The quantum computing system 12 includes the processor device(s) 14, the memory 16, and a system bus 64. The system bus 64 provides an interface for system components including, but not limited to, the memory 16 and the processor device(s) 14. The processor device(s) 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the quantum computing system 12. The volatile memory 68 may also include a high-speed RAM, such as static RAM, for caching data.

The quantum computing system 12 may further include or be coupled to a non-transitory computer-readable storage medium such as the storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like.

A number of modules can be stored in the storage device 72 and in the volatile memory 68, including an operating system 69 and one or more program modules, such as the QSCS handler 36, which may implement the functionality described herein in whole or in part. All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the QSCS handler 36 in the volatile memory 68, may serve as a controller, or control system, for the quantum computing system 12 that is to implement the functionality described herein.

Because the QSCS handler 36 is a component of the quantum computing system 12, functionality implemented by the QSCS handler 36 may be attributed to the quantum computing system 12 generally. Moreover, in examples where the QSCS handler 36 comprises software instructions that program the processor device(s) 14 to carry out functionality discussed herein, functionality implemented by the QSCS handler 36 may be attributed herein to the processor device(s) 14.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include the communications interface 78 suitable for communicating with the network as appropriate or desired. The quantum computing system 12 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A computer-implemented method, comprising:
receiving, by a quantum computing system that implements a Quantum Seed Chunk Size (QSCS) service, instructions to generate a seed via quantum random number generation for cryptographic synchronization within a federated quantum computing environment comprising the quantum computing system and one or more second quantum computing systems;

obtaining information descriptive of one or more characteristics of (a) the quantum computing system, or (b) some other computing entity of the federated quantum computing environment;

determining a seed chunk size based at least in part on the one or more characteristics;

generating the seed for cryptographic synchronization, wherein a size of the seed is equivalent to the seed chunk size; and providing the seed to the one or more second quantum computing systems.

2. The computer-implemented method of claim 1, wherein determining the seed chunk size comprises determining the seed chunk size based at least in part on the one or more characteristics and a quantity of computing entities to be included in the federated quantum computing environment.

3. The computer-implemented method of claim 2, wherein receiving the instructions to generate the seed comprises receiving instructions for establishment of the federated quantum computing environment, wherein the instructions for establishment of the federated quantum computing environment comprise the instructions to generate the seed via quantum random number generation, and wherein the instructions for establishment of the federated quantum computing environment are indicative of a quantity of computing entities to be included in the federated quantum computing environment.

4. The computer-implemented method of claim 3, wherein the method further comprises receiving information indicative of successful establishment of the federated quantum computing environment.

5. The computer-implemented method of claim 4, wherein the method comprises performing the QSCS service, and wherein performing the QSCS service comprises the steps of:

determining the seed chunk size based at least in part on the one or more characteristics;

generating the seed for cryptographic synchronization, wherein the size of the seed is equivalent to the seed chunk size; and providing the seed to the one or more second quantum computing systems.

6. The computer-implemented method of claim 5, wherein performing the QSCS service further comprises detecting a change in a quantity of computing entities included in the federated quantum computing environment.

7. The computer-implemented method of claim 6, wherein performing the QSCS service further comprises:

obtaining information descriptive of changes to the one or more characteristics;

determining a second seed chunk size based at least in part on the changes to the one or more characteristics;

generating a second seed, wherein the size of the second seed is equivalent to the second seed chunk size; and providing the second seed to the one or more second quantum computing systems.

8. The computer-implemented method of claim 6, wherein the method further comprises:

receiving a second seed from a second quantum computing system of the one or more second quantum computing systems, wherein a size of the second seed is different than the seed chunk size; and using the second seed for provision of cryptographic services.

9. The computer-implemented method of claim 1, wherein the method further comprises:

using the seed to generate cryptographic information; and sending the cryptographic information to at least one of the one or more second quantum computing systems.

10. The computer-implemented method of claim 1, wherein the method further comprises:

receiving encrypted information from at least one of the one or more second quantum computing systems; and decrypting the encrypted information based at least in part on the seed.

11. The computer-implemented method of claim 1, wherein the one or more characteristics of the quantum computing device comprise at least one of:

a quantity of qubits allocated to the quantum computing device;

a T1 time for a qubit of the quantum computing device;

a T2 time for a qubit of the quantum computing device; or a quantum state for the quantum computing device.

12. The computer-implemented method of claim 1, wherein a computing entity comprises:

a quantum computing device;

a quantum computing system;

a classical computing device; or a classical computing system.

13. A quantum computing system that implements a Quantum Seed Chunk Size (QSCS) service, comprising:

one or more computing devices to:

receive instructions to generate a seed via quantum random number generation for cryptographic synchronization within a federated quantum computing environment comprising the quantum computing system and one or more second quantum computing systems;

obtain information descriptive of one or more characteristics of (a) the quantum computing system, or (b) some other computing entity of the federated quantum computing environment;

determine a seed chunk size based at least in part on the one or more characteristics;

generate the seed for cryptographic synchronization, wherein a size of the seed is equivalent to the seed chunk size; and provide the seed to the one or more second quantum computing systems.

14. The quantum computing system of claim 13, wherein determining the seed chunk size comprises determining the seed chunk size based at least in part on the one or more characteristics and a quantity of computing entities to be included in the federated quantum computing environment.

15. The quantum computing system of claim 13, wherein receiving the instructions to generate the seed comprises receiving instructions for establishment of the federated quantum computing environment, wherein the instructions for establishment of the federated quantum computing environment comprise the instructions to generate the seed via quantum random number generation, and wherein the instructions for establishment of the federated quantum computing environment are indicative of a quantity of computing entities to be included in the federated quantum computing environment.

16. The quantum computing system of claim 15, wherein the one or more computing devices are further to receive information indicative of successful establishment of the federated quantum computing environment.

17. The quantum computing system of claim 16, wherein the one or more computing devices are further to detect a change in a quantity of computing entities included in the federated quantum computing environment.

18. The quantum computing system of claim 17, wherein the one or more computing devices are further to:
   obtain information descriptive of changes to the one or more characteristics;
   determine a second seed chunk size based at least in part on the changes to the one or more characteristics;
   generate a second seed, wherein the size of the second seed is equivalent to the second seed chunk size; and
   provide the second seed to the one or more second quantum computing systems.

19. The quantum computing system of claim 17, wherein the one or more computing devices are further to:
   receive a second seed from a second quantum computing system of the one or more second quantum computing systems, wherein a size of the second seed is different than the seed chunk size; and
   use the second seed for provision of cryptographic services.

20. A non-transitory computer-readable storage medium that includes executable instructions to cause a processor device of a quantum computing system that implements a Quantum Seed Chunk Size (QSCS) service to:
   receive instructions to generate a seed via quantum random number generation for cryptographic synchronization within a federated quantum computing environment comprising the quantum computing system and one or more second quantum computing systems;
   obtain information descriptive of one or more characteristics of (a) the quantum computing system, or (b) some other computing entity of the federated quantum computing environment;
   determine a seed chunk size based at least in part on the one or more characteristics;
   generate the seed for cryptographic synchronization, wherein a size of the seed is equivalent to the seed chunk size; and
   provide the seed to the one or more second quantum computing systems.

* * * * *